M. H. AVRAM.
EFFICIENCY RECORDER.
APPLICATION FILED JUNE 29, 1915.

1,339,381.

Patented May 11, 1920.

WITNESSES:

INVENTOR
Moïs H. Avram
BY
Briesen & [Knauth]
ATTORNEY

Fig. 2

M. H. AVRAM.
EFFICIENCY RECORDER.
APPLICATION FILED JUNE 29, 1915.

1,339,381.

Patented May 11, 1920.
6 SHEETS—SHEET 4.

WITNESSES:

INVENTOR
Moïs H. Avram
BY
Briesen & Knauth
ATTORNEY

M. H. AVRAM.
EFFICIENCY RECORDER.
APPLICATION FILED JUNE 29, 1915.

1,339,381.

Patented May 11, 1920.
6 SHEETS—SHEET 5.

WITNESSES:

INVENTOR
Moïs H. Avram
BY
ATTORNEY

M. H. AVRAM.
EFFICIENCY RECORDER.
APPLICATION FILED JUNE 29, 1915.

1,339,381.

Patented May 11, 1920.
6 SHEETS—SHEET 6.

WITNESSES:

INVENTOR

BY

ATTORNEY

UNITED STATES PATENT OFFICE.

MOÏS H. AVRAM, OF NEW YORK, N. Y., ASSIGNOR TO SLOCUM, AVRAM & SLOCUM LABORATORIES, INC., OF NEWARK, NEW JERSEY, A CORPORATION OF NEW YORK.

EFFICIENCY-RECORDER.

1,339,381.   Specification of Letters Patent.   Patented May 11, 1920.

Application filed June 29, 1915. Serial No. 36,942.

*To all whom it may concern:*

Be it known that I, Moïs H. AVRAM, a citizen of the United States, and a resident of New York city, county and State of New York, have invented certain new and useful Improvements in Efficiency-Recorders, of which the following is a specification.

This invention relates to a novel efficiency recorder designed to provide simple, effective and reliable means for controlling the working time, the output, etc., of the several machines installed in a manufacturing or other plant and for obtaining other valuable data about the operation of said machines, the economic management of the plant, the alertness and diligence of the workmen without having to rely upon the judgment of the foreman. The controlling means above referred to comprise more particularly means for recording the periods of operation and rest of each machine at the same time giving the speed or output thereof, a counter for recording the aggregate output, an indicator for perceivably announcing whether the machine is running or not, and finally an accumulator showing the aggregate running time of said machine. These controlling means are built up in units for each machine, so that the manufacture of recorders for different numbers of machines is greatly simplified. The invention also comprises other novel features of construction more fully brought out in the appended specification and claims.

In the accompanying drawings,

Fig. 3 an enlarged vertical cross section on line 3—3, Fig. 1, looking toward the right;

Fig. 13 a wiring diagram of one of the recording electromagnets, and Fig. 14 a modification of part of said diagram.

The operative mechanism of my improved efficiency recorder is preferably inclosed within a substantially rectangular casing 15, the dimensions of which vary with the number of machines to be controlled by said recorder. The drawings show a recorder for simultaneously supervising twenty machines, each of such machines being connected to a unit of registering, counting, signaling and working time-accumulating devices as will hereinafter more fully be explained, although it is obvious that a smaller or even a larger number of such units may be incorporated in a single recorder.

Figure 1:
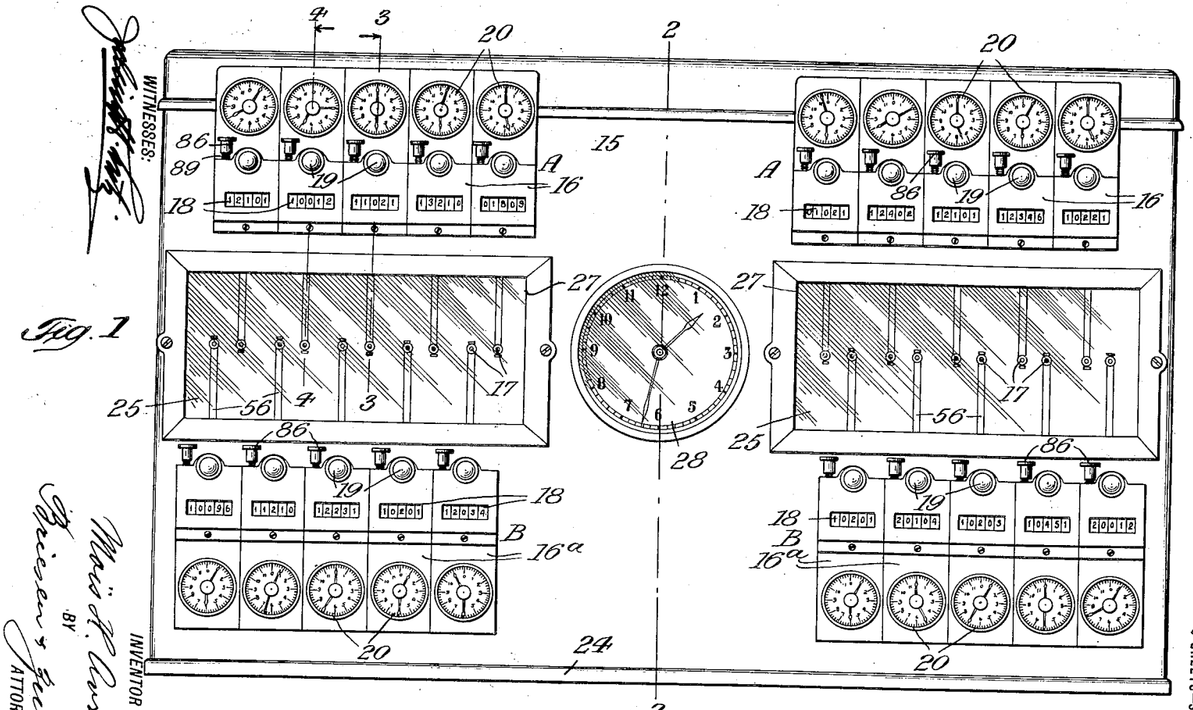
Fig. 1 is a front view of an efficiency recorder embodying my invention.
Figure 2:
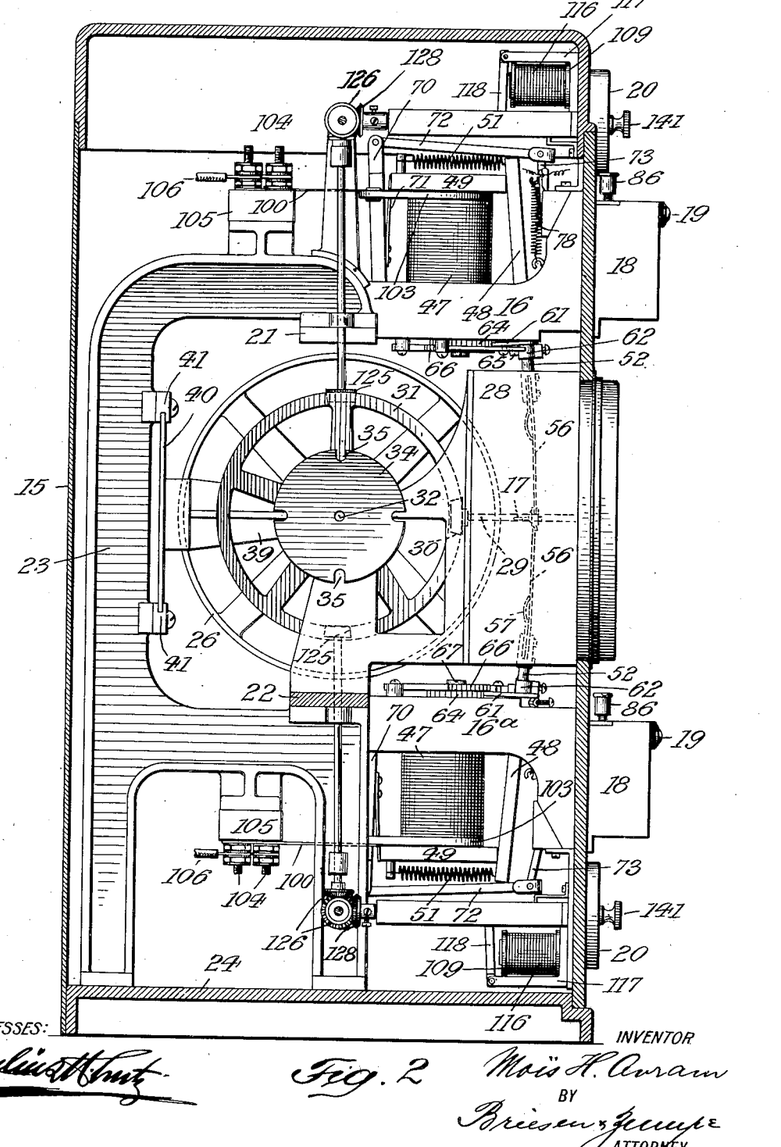
Fig. 2 a vertical cross section on line 2—2, Fig. 1.

Each of these units comprises essentially a frame 16 which is accommodated within the casing 15 and supports firstly a recording needle or stylo 17, secondly a counter 18, thirdly a signal lamp or other indicator 19 for perceivably announcing the operation or standstill of the machine and fourthly a working time-accumulator 20. With multi-needle recorders as illustrated, the frames 16 are shown to be arranged in an upper tier A and a lower tier B, each of said tiers comprising two sets of say five frames each, the frames of each set being located in close proximity to one another. The frames 16 of the upper tier are firmly attached to a common bar 21 while the frames 16ᵃ of the lower tier are secured to a common bar 22. The lower frames 16ᵃ are for manufacturing reasons true duplicates of the upper frames 16 as appears from Fig. 2, the lower frames being however secured to rail 22 in a reversed position when compared with that of the upper frames. The bars 21, 22 are supported by a pair of standards 23 which are attached to a base plate 24 that forms part of the casing 15. The needles 17 of the superposed upper and lower sets of frames 16, 16ᵃ respectively, produce their markings in alternating order on a common record chart 25 shown to be laid about a cylindrical drum 26 and visible through a window 27 provided in the front wall of the casing 15. Between the two superposed sets of frames is arranged a clock 28 the driving spring of which is calculated to be of such a strength as to not only operate the clock work proper but to also actuate the drums 26 and the working time-accumulators 20, the mechanism actuated by the clock shaft 29 being illustrated in Figs. 2, 3, 7 and 10.

The clock shaft 29 is provided with a beveled gear wheel or driving pinion 30 that meshes into a gear wheel 31 that is firmly mounted on a shaft 32 journaled in bearings 33. At each end, shaft 32 carries a disk 34 provided with a plurality of peripheral notches 35. The notches of each disk are adapted to be engaged by a spring-influenced coupling pin 36 slidably mounted in an arm 37 which is fast on the protruding end of the shaft 38 of drum 26. Shaft 38 is rotatably mounted in brackets 39 of a slide 40 that is received within corresponding guide rails 41 of standards 23. If a chart 25 is to be renewed, the slide 40 is withdrawn from casing 15 through a suitably arranged door (not shown), the old chart is withdrawn after opening a suitable paper clamp 42, and a blank chart is laid about and fixed to the drum. The slide 40 is then reintroduced into guide rails 41 so that upon the engagement of pin 36 with one of the notches 35, the drum will receive rotary motion from the clock 28.

In order to permit a ready adjustment of the starting line of the chart 25 relatively to needles 17 after the slide 40 has been properly inserted into casing 15, the drum 26 carrying said chart is loosely mounted on shaft 38 and is adapted to be taken along by frictional contact only. For this purpose the shaft 38 carries a preferably cloth-covered relatively fixed friction disk 43 against which one of the end walls 44 of the drum is forced by a coiled spring 45, a washer 46 being preferably interposed between said wall and spring. It will thus be seen that by the construction described, the chart may be properly adjusted by hand before the recorder is started.

Figures 3, 13, 14:
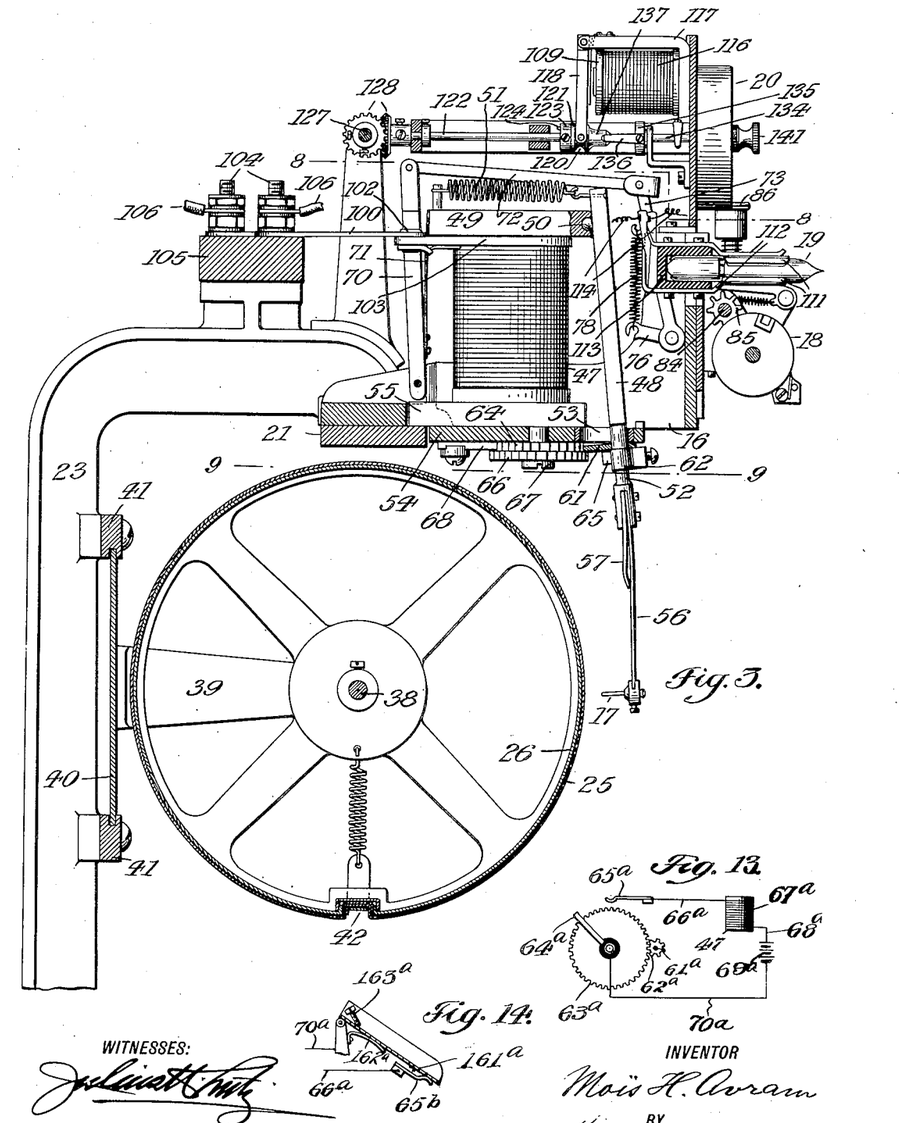
Figures 4, 5, 6:
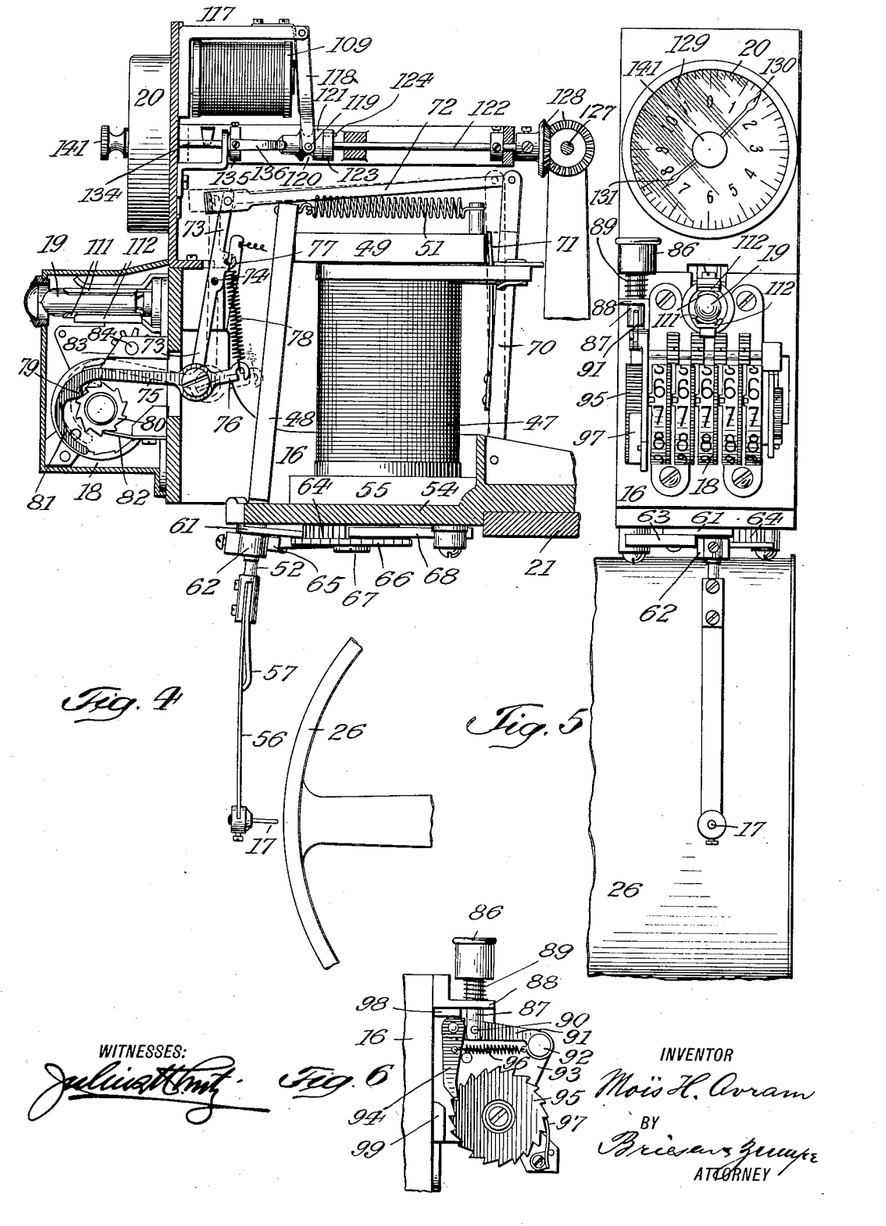
Fig. 4 a similar section on line 4—4, Fig. 1, looking toward the left.
Fig. 5 a front elevation of Fig. 4 with some of the parts omitted.
Fig. 6 a detail of the counter-resetting device.
Figure 7:
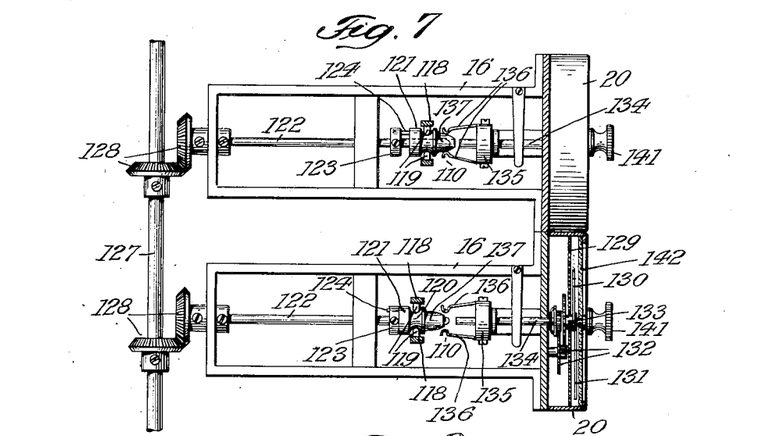
Fig. 7 a top view partly in section of the working time-accumulating device.
Figure 8:
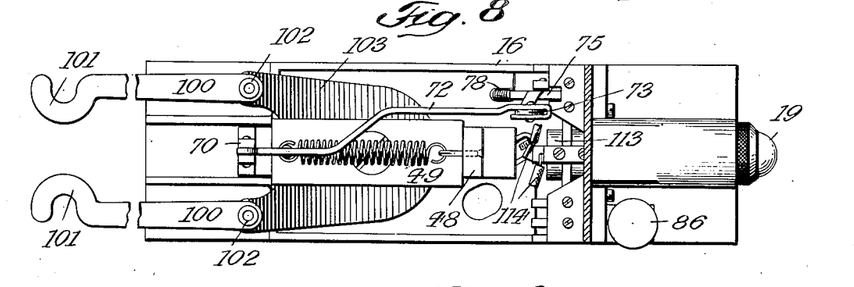
Fig. 8 a horizontal section on line 8—8, Fig. 3.
Figure 9:
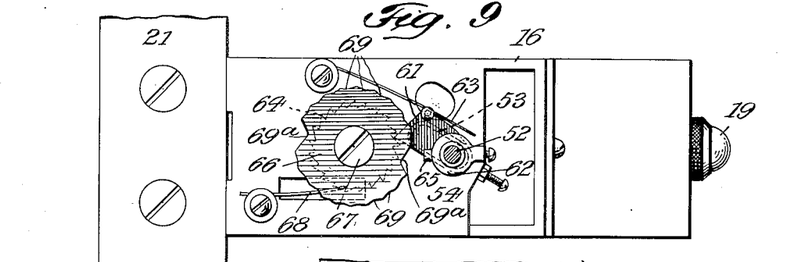
Fig. 9 a horizontal section on line 9—9, Fig. 3, looking upward.
Figure 10:
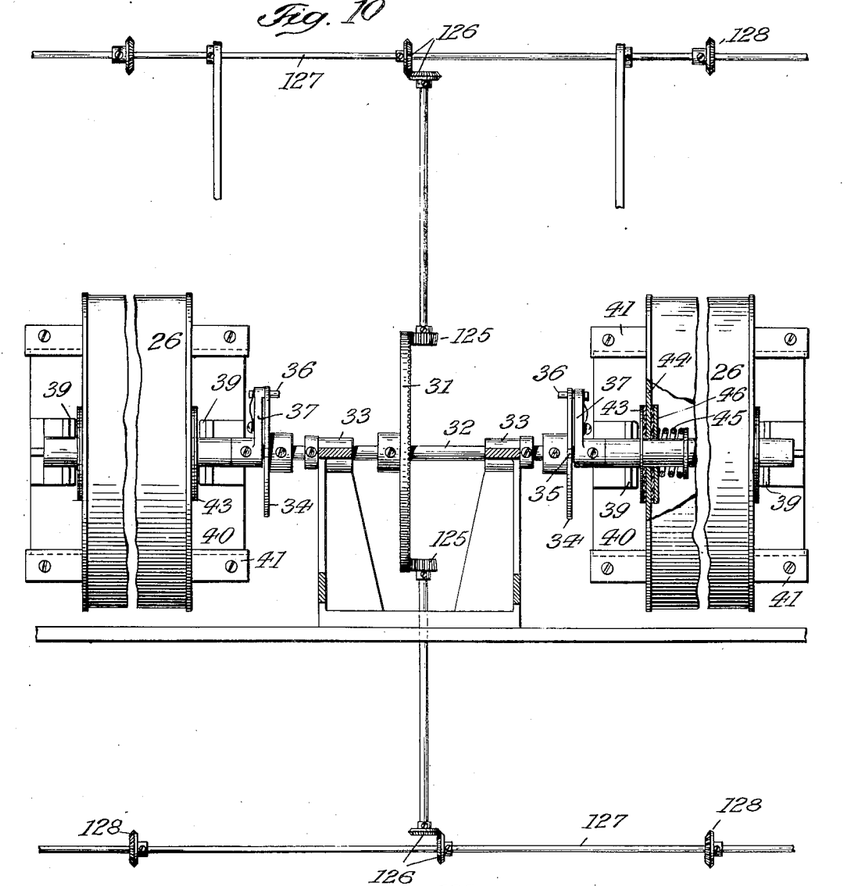
Fig. 10 a diagrammatic view of the mechanism for operating the recording drums and working time-accumulating devices.
Figure 11:
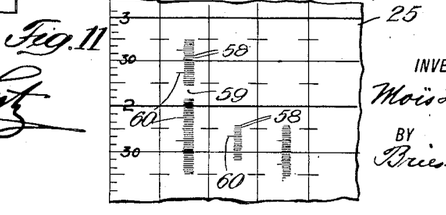
Fig. 11 a face view of part of a recording chart.
Figure 12:
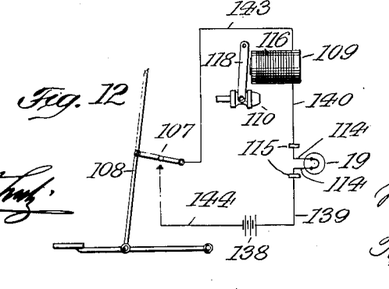
Fig. 12 a wiring diagram.

Each of the needles 17 is operated by an electromagnet 47 which is adapted to be intermittently energized by the closing of a suitable contact which closing is effected by the machine to be controlled or by the article manufactured thereby. The construction and application of this contact do not form part of the present invention they depending entirely upon the kind of machine to be controlled, and upon the kind of control desired, i. e., whether the speed and working time or the output is to be recorded. In Fig. 13 a wiring diagram is shown representing the connections for transmitting to the magnet 47 the speed and working time of a shaft $61^a$ that may form part of any machine. Upon shaft $61^a$ is firmly mounted a pinion $62^a$ meshing into a gear wheel $63^a$, the ratio between wheels $62^a$, $63^a$ being 1 to 10. Gear wheel $63^a$ is provided with an insulated contact finger $64^a$ that is adapted to engage a contact spring $65^a$ which is, by wire $66^a$, connected to the winding $67^a$ of electromagnet 47. Winding $67^a$ is, by wire $68^a$ connected to a battery $69^a$ or other source of electricity, which is in turn connected to finger $64^a$ by wire $70^a$. It will thus be seen that whenever shaft $61^a$ performs ten complete revolutions, finger $64^a$ will engage spring $65^a$ to close an electric circuit for energizing electromagnet 47, which will in turn cause stylus 17 to mark time sheet 25 accordingly. If on the other hand the output is to be controlled the finished articles may be consecutively discharged from the machine upon a pivoted inclined metal chute $161^a$, Fig. 14, which is normally slightly spaced from a contact spring $65^b$ by means of a spring $162^a$, said spring $65^b$ and chute being respectively connected to the wires $66^a$, $70^a$ hereinabove referred to. It will thus be seen that when a finished article such as a screw bolt $163^a$ slides along chute $161^a$, the latter will be lowered against the action of spring $162^a$ to engage contact $65^b$ and thus close the circuit above described. The mechanism controlled by the electromagnet 47 for operating the needle 17 corresponds substantially to that shown and described in United States Letters Patent #1,131,104 granted to me March 9th, 1915. This mechanism comprises essentially an armature 48 which is connected to the upper pole shoe 49 of electromagnet 47 by a ball and socket joint 50, a spring 51 maintaining the armature in permanently operative engagement with the pole shoe 49. The lower cylindrical end or stem 52 of armature 48 is received within an inclined or diagonal slot 53 of a plate 54 located below the lower pole shoe 55 of electromagnet 47. To the lower end of stem 52 is attached a spring 56 that carries the needle 17, the inward play of said needle being limited by a finger 57 firmly attached to the stem 52. The mutual relation of the parts is such that the needle 17 is normally slightly spaced from the chart 25, the lower end of armature 48 being swung outward by spring 51. As soon as the electromagnet 47 is energized, the armature will be attracted by the pole shoe 55 and owing to its slanting movement along the inclined slot 53, the yieldingly mounted needle 17 will be drawn along the chart 25 in a substantially horizontal direction, to mark a line 58 thereon.

It will thus be seen that as long as the machine to be controlled is properly operated, the electromagnet 47 will be intermittently energized with the result that a vertical column of parallel straight lines 58 will be produced on the slowly advancing chart. During a stoppage of the machine, the chart will remain blank, until the machine is restarted, such blank spaces 59 thus clearly indicating the periods of rest of the machine, while the mutual distance of the recorded lines will indicate the speed of the machine while it was running.

In order to facilitate the reading and counting of the lines 58, marked by each needle on the chart, provisions are made for drawing at certain intervals lines 60 the length of which exceeds that of lines 58, the drawing showing every tenth line to be such a line of greater length.

For this purpose there is loosely mounted on stem 52 a pawl 61 which is supported on a collar 62 fast on said stud. Pawl 61 is influenced by a spring 63 and engages a ratchet wheel 64, while a stud 65 on collar 62 is adapted to engage the rim of a disk 66 that is firmly secured to ratchet wheel 64. The disk and ratchet wheel are loosely mounted on a screw 67, a return movement of said disk and ratchet wheel being prevented by a detent 68 engaging the ratchet wheel. The latter is shown to be provided with twenty teeth, while the disk 66 is furnished with twenty scallops 69 two diametrically opposed scallops 69a being made of greater depth than the remainder of the scallops. As long as during the consecutive attractions of armature 48 by electromagnet 47, the stud 65 engages shallow recesses 69, short lines 58 will be drawn on the chart 25 while whenever said stud enters one of the deep scallops 69a, a long line 60 will be produced. Besides thus regulating the length of the needle stroke, the scallops have the additional function of preventing an accidental overthrowing of the ratchet wheel 64 by pawl 61 so that a uniform operation of the recording needles may be depended upon.

The counter 18 hereinabove referred to indicates at a glance the aggregate number of lines drawn by the needle 17, pertaining to the same unit, and is actuated by the electromagnet 47 pertaining to said unit. For this purpose there is pivoted to each frame 16 an armature 70 which is normally held off pole shoe 49 by a nonmagnetic spring 71, the free end of which is interposed between said armature and pole shoe so as to prevent any undesirable sticking of the former to the latter. Armature 70 is, by a link 72, operatively connected to the first arm of a two-arm lever 73 pivoted at 74. To the second arm of this lever is fulcrumed a combined feed pawl and brake member 75 the rearwardly extending heel 76 of which is connected to a hook 77 formed on the first arm of lever 73 by means of a spring 78. Member 75 is provided with a nose 79 adapted to engage the ratchet wheel 80 of the counter 18 and with a curved tail 81 adapted to frictionally engage wheel 80 so as to constitute a brake. Ratchet wheel 80 is furthermore engaged by a detent 82 that prevents any return movement thereof. It will be seen that at the end of each advance movement of ratchet wheel 80 through nose 79, the brake 81 will frictionally engage said wheel thus positively preventing an accidental overthrowing thereof, while detent 82 secures the ratchet wheel from being taken along during the return movement of member 75. In order to insure an effective braking of the ratchet wheel even if a tail 81 should not engage said wheel at the end of the feed stroke of member 75 owing to defective shape, the bearing 83 of the shaft 84 carrying the transfer pinions 85 of the counter is so constructed as to constitute an abutment for said member which will thus become wedged in between said bearing and ratchet wheel to frictionally engage the latter.

The counter 18 is further provided with a novel zero-setting device which is operated by a pressure button 86. The stem 87 of the latter is slidably mounted in a bearing 88 and is normally held in its elevated position by a spring 89. The lower end of stem 87 is pivoted at 90 to a lever 91 fulcrumed at 92 to a bracket 93 of frame 16. To the free end of lever 91 is fulcrumed a pawl 94 adapted to engage a resetting ratchet wheel 95 of the counter 18, the parts 94, 95 being held in coöperative relation by a spring 96. Ratchet wheel 95 is engaged by a detent 97 while the stroke of the pawl 94 is limited by fixed upper and lower abutments 98, 99 respectively. Thus by repeatedly operating the several buttons 86 all of the counters 18 may be set to zero at the beginning of each work day or at another time convenient for the person in charge of the efficiency recorder.

In order to facilitate the assemblage of the parts, the ends of the coil of each electromagnet 47 are conductively connected to a pair of metallic contacts 100 provided with hooks 101 at their free ends. The contacts 100 are pivoted at 102 to a forked insulating plate 103 interposed between pole shoe 49 and the coil of said electromagnet. The hooks 101 are adapted to be clamped to binding posts 104 carried by a transverse insulating rail 105, said binding posts being in turn, by wires 106, connected to the intermittently actuated circuit closing means of the machine to be controlled (not shown).

In addition to the intermittently actuated circuit closing means just referred to, each machine is provided with a switch 107 which is automatically closed whenever the machine is started and remains closed until the machine is stopped whereupon the switch is automatically opened, the switch being shown to be connected to the treadle actuated clutch-operating rod or member 108. The circuit controlled by the switch 107 performs the dual function of lighting the lamp 19 to indicate at the office which machines are running and of energizing an electromagnet 109 in order to close the clutch 110 of the working time accumulator 20. The filament of lamp 19 is connected to a pair of outer contacts 111 that are engaged by corresponding contact springs 112 of the lamp socket 113 which is made of insulating material. Springs 112 are, by wires 114, connected to suitable binding posts 115 that are substantial duplicates of posts 104. The lamp 19 is preferably connected in series with the coil 116 of the corresponding electromagnet 109, which latter is supported by a bracket 117. To this bracket is fulcrumed a spring-influenced armature 118 the forked lower end of which is provided with a pair of inwardly extending pins 119 that engage a circumferential groove 120 of a slide 121 carried by a continuously revolving spindle 122. To the latter is firmly attached a collar 123 a perforation of which is engaged by a pin 124 of the slide 121 so that said slide participates in the rotation of the spindle 122 while the collar at the same time limits the inward play of the slide. For imparting rotary movement to the several upper and lower spindles 122, the gear wheel 31 is permanently engaged by upper and lower pinions 125 that transmit their movement through beveled gear wheels 126 to upper and lower spindles 127 which are connected through beveled gear wheels 128 with the several spindles 122.

Each time-accumulator 20 comprises an ordinary clock dial 129 in front of which play a minute hand 130 and an hour hand 131 said hands being mutually connected through the conventional gearing 132. The hollow stem 133 of the minute hand engages frictionally an arbor 134 mounted coaxially with the corresponding spindle 122. Arbor 134 carries a relatively fixed collar 135 to which a pair of friction springs 136 are secured that are adapted to engage the tapering head 137 of the slide 121.

As long as the switch 107 is closed a circuit will be established, the current of which flows as follows:—from the source of electricity 138 through wires 139, 114, lamp 19, wires 114, 140, coil 116, wire 143, switch 107 and wire 144 back to source 138. Thus not only the lamp 19 is ignited but the armature 118 is attracted to force the tapering head 137 of slide 121 into the gap formed between springs 136. In this way the arbor 134 will participate in the rotation of spindle 122 to correspondingly drive the accumulator hands 130, 131.

The several gearings for driving the accumulator are so calculated as to drive the hands thereof in complete unison with the hands of the clock 28. In this way the accumulator will be maintained running as long as the machine to be controlled thereby is running. Whenever said machine is stopped by properly operating the clutch rod 108 and thereby opening the switch 107, the arbor 134 is uncoupled from the alined spindle 122 so that the accumulator hands will come to a standstill while the clock hands remain in motion. After a re-starting of the machine, the accumulator hands will also be re-started, the accumulator thus indicating the aggregate working time of the machine. For permitting a ready setting of the accumulator hands to zero, the stem of the minute hand 130 carries a knob 141 that projects outward through a corresponding perforation of the glass disk 142 located in front of the accumulator dial.

My time-accumulators are shown to indicate the aggregate working time of the machines so that by subtracting said time from the actual running time of the plant or shop, the period of idleness of the several machines may be ascertained. I desire it to be expressly understood however, that in lieu of this control, the accumulators may indicate aggregate periods of idleness of the machines without departing from the spirit of my invention, the phrase "working time" of the machine contained in the claims being for the purpose of this invention an equivalent of: "idle time" of the machine.

I claim:

1. An efficiency recorder of the class described, comprising a clock mechanism, means coöperating therewith for recording the working of the machine the efficiency of which it is desired to control and means operable by said clock for automatically accumulating the working time of said machine, said recording and accumulating means being independently controlled by the machine but adapted for simultaneous operation when the machine is running.

2. An efficiency recorder of the class described, comprising a clock mechanism, means coöperating therewith for recording the periods of working and thereby indicating the periods of rest of the machine the efficiency of which it is desired to control and means operable by said clock for automatically accumulating the working time of said machine, said recording and accumulating means being independently connected with the machine but adapted for simultaneous operation when the machine is running.

3. An efficiency recorder of the class described, comprising a clock mechanism, means coöperating therewith for recording the periods of working and thereby indicating the periods of rest of the machine the efficiency of which it is desired to control, means for perceivably announcing the working of the machine, and means operable by said clock for automatically accumulating the working time of said machine, the control of said recording means by the machine being independent of the control thereby of the announcing and accumulating means but all adapted for simultaneous operation when the machine is running.

4. An efficiency recorder of the class described, comprising a clock mechanism, means coöperating therewith for recording the periods of working and thereby indicating the periods of rest of the machine the efficiency of which it is desired to control, an electric indicator for announcing the working of the machine and means operable by said clock for automatically accumulating the working time of said machine, the control of said recording means by the machine being independent of the control thereby of the announcing and accumulating means but all adapted for simultaneous operation when the machine is running.

5. An efficiency recorder of the class described, comprising a clock mechanism, means coöperating therewith for recording the periods of working and thereby indicating the periods of rest of the machine the efficiency of which it is desired to control, means for perceivably announcing the working of the machine, means operable by said clock for automatically accumulating the working time of said machine, common means for controlling said indicator and time accumulating means by the machine and separate means for controlling said recording means by the machine said controlling connections being such that said indicating, accumulating and recording means are simultaneously operable when the machine is running.

6. An efficiency recorder of the class described, comprising a clock mechanism, means coöperating therewith for recording the periods of working and thereby indicating the periods of rest of the machine the efficiency of which it is desired to control, an electric indicator for announcing the working of the machine, an electromagnet, an accumulator operable by the clock and controlled by said electromagnet for accumulating the aggregate working time of the machine, common means for controlling the indicator and electromagnet by the machine and separate means for controlling said recording means by the machine, said controlling connections being such that said indicating, accumulating and recording means are simultaneously operable when the machine is running.

7. An efficiency recorder of the class described, comprising a clock mechanism, means coöperating therewith for recording the periods of working and thereby indicating the periods of rest of the machine the efficiency of which it is desired to control, an electric indicator for announcing the working of the machine, an electromagnet in circuit with said indicator, an accumulator operable by the clock and controlled by said electromagnet for accumulating the aggregate working time of the machine, means including a separate circuit and electromagnet for controlling said recording means by the machine and means for closing said first named circuit and for placing said recording means under the control of the machine simultaneously with the starting of the machine, whereby said indicator, accumulator and recording means are simultaneously operable when the machine is running.

8. An efficiency recorder of the class described, comprising a clock mechanism, a chart movable thereby, means actuated by the machine the efficiency of which it is desired to control for intermittently marking said chart while the machine is working, means operably connected with said chart marking means for automatically counting the number of said markings, and indicator for announcing the working of the machine and an accumulator operable by said clock for recording the aggregate working time of the machine, said marking means, indicator and accumulator being simultaneously operable when the machine is running.

9. An efficiency recorder adapted for controlling the efficiency of a number of machines and composed of a like number of units, each unit being adapted to coöperate with one of said machines, a clock mechanism and a chart operated thereby common to all of said units, each unit comprising a recording needle adapted to coöperate with said chart and a counter, both adapted to be operated by one of said machines, an indicator and a working time accumulator adapted to be operated by said clock and thrown into operation by starting the corresponding machine and means for holding said units in coöperative relation to said clock mechanism and chart.

10. An efficiency recorder adapted for controlling the efficiency of a number of machines and composed of a like number of units, each unit being adapted to coöperate with one of said machines, a clock mechanism and a chart operated thereby common to all of said units, each unit comprising a frame, a recording needle adapted to coöperate with said chart when the machine is working, a counter adapted to be actuated each time the needle is operated, an indicator and a working time accumulator supported by said frame adapted to be operated by said clock and thrown into operation by starting the corresponding machine and a common support for said frames adapted to hold said units in coöperative relation with said clock mechanism and chart.

11. An efficiency recorder of the class described, comprising a chronometric motor, a chart adapted to be driven thereby, means for recording on said chart the working of the machine the efficiency of which it is desired to control adapted to be actuated by the machine when working, the working time accumulator and means adapted to be actuated by starting the machine for coupling said accumulator to said motor during the working periods of the machine, said recording means and the accumulator being separately connected with the machine but simultaneously operable while the machine is running.

12. An efficiency recorder of the class described, comprising a chronometric motor, a chart adapted to be driven thereby, means for recording on said chart the working of the machine the efficiency of which it is desired to control adapted to be actuated by the machine when working, an indicator for announcing the working of said machine, a working time accumulator, a coupling intermediate said motor and accumulator and means controlled by starting the machine for setting the indicator and actuating said coupling during the working periods of the machine, said recording means, the indicator and said accumulator being simultaneously operable when the machine is running.

13. An efficiency recorder of the class described, comprising a chronometric motor, a toothed wheel driven thereby, a drum adapted to be coupled to said toothed wheel, a chart adapted to be attached to said drum, a recording needle adapted to be actuated by the machine the efficiency of which it is desired to control for producing markings on said chart while the machine is working, a pinion engaging the toothed wheel, a working time accumulator, a coupling intermediate said pinion and said accumulator and means adapted to be actuated by starting the machine for closing said coupling during the working periods of the machine.

14. In an efficiency recorder of the class described, the combination of a motor, a spindle continuously driven thereby, a working time accumulator, a coupling intermediate said spindle and accumulator, an electromagnet for actuating said coupling adapted to be energized by starting the machine the efficiency of which it is desired to control and an indicator actuated simultaneously and concurrently with said magnet.

15. In an efficiency recorder of the class described, the combination of a motor, a spindle permanently driven thereby, a working time accumulator, a coupling intermediate said spindle and accumulator, an electromagnet for actuating said coupling, an electric indicator in circuit with said magnet and a switch for closing the electromagnet and indicator circuit, said switch being adapted to be automatically operated by the starting and stopping of the machine the efficiency of which it is desired to control.

16. In an efficiency recorder of the class described the combination of a clock mechanism, a chronographic chart operated thereby, a needle in proximity to said chart, an electro-magnet adapted to be intermittently energized for causing said needle to mark the chart, the magnet being thus energized during the working periods of the machine, the efficiency of which it is desired to control, a working time accumulator adapted to be connected with said clock mechanism and an electromagnet for making said connection, adapted to be energized continuously during the working periods of the machine.

17. In an efficiency recorder of the class described the combination of a clock mechanism, a chronographic chart operated thereby, a needle in proximity to said chart, an electro-magnet adapted to be intermittently energized for causing said needle to mark the chart, the magnet being thus energized during the working periods of the machine the efficiency of which it is desired to control, a working time accumulator adapted to be connected with said clock mechanism, an electromagnet for making said connection, adapted to be energized continuously during the working periods of the machine and an indicator adapted to be simultaneously and concurrently displayed during the time said accumulator magnet is energized.

MOÏS H. AVRAM.